United States Patent [19]

Moore

[11] Patent Number: 4,947,580

[45] Date of Patent: Aug. 14, 1990

[54] MANUAL DEVICES AND METHODS FOR SELECTIVE APPLICATION OF CHEMICAL SUBSTANCES TO PLANTS

[76] Inventor: James E. Moore, 555 Riviera Dr., Naples, Fla. 33940

[21] Appl. No.: 293,925

[22] Filed: Jan. 5, 1989

Related U.S. Application Data

[60] Continuation-in-part of Ser. No. 111,046, Oct. 20, 1987, abandoned, which is a division of Ser. No. 844,119, Mar. 26, 1986, Pat. No. 4,716,677.

[51] Int. Cl.⁵ ............................................. A01M 21/00
[52] U.S. Cl. .......................................... 47/1.5; 401/10; 401/11; 401/193
[58] Field of Search ........................................ 401/9–11, 401/193, 198, 202, 137, 138, 139, 140, 199; 15/210 A, 209 R, 209 D, 214, 167.2; 47/1.5, 1.7

[56] References Cited

U.S. PATENT DOCUMENTS

| | | | |
|---|---|---|---|
| 633,779 | 9/1899 | Bagley | 15/210 |
| 2,055,314 | 9/1936 | Seburger | 401/10 |
| 2,908,923 | 10/1959 | Schlechter | 47/1.5 |
| 3,056,998 | 10/1962 | Ebner | 401/9 |
| 3,594,089 | 7/1971 | Powell | 401/9 |
| 4,126,962 | 11/1978 | Polcaro | 47/1.5 |
| 4,347,010 | 8/1982 | Petkoff | 401/10 |

FOREIGN PATENT DOCUMENTS

| | | | |
|---|---|---|---|
| 60812 | 4/1943 | Denmark | 401/10 |
| 2180174 | 3/1987 | United Kingdom | 401/9 |

*Primary Examiner*—Danton D. DeMille
*Attorney, Agent, or Firm*—Arnold, White & Durkee

[57] ABSTRACT

Hand-held chemical applicators are provided for applying chemicals such as herbicide to selected plants while surrounding plants are shielded from accidental contact. The chemical is forcefully applied by gripping or pressing a selected portion of the plant against an applicator pad containing the chemical. The amount of applied chemical is controlled by variation of the pressure or area of contact between the plant and the pad. Preferably a porous applicator pad is mounted between the distal portions of a pair of elongated tongs so as to define a shielded application zone. A supply of liquid is stored in a small bottle attached to the tongs. One of the tongs is hollow and contains the applicator pad and a channel for the liquid to flow from the bottle to the pad. The second tong is in the form of a resilient strip which the operator can press toward the hollow tong when maneuvering among plants and when grasping a portion of an undesired plant. Several alternative arrangements are provided for connecting the tongs to the bottle.

4 Claims, 5 Drawing Sheets

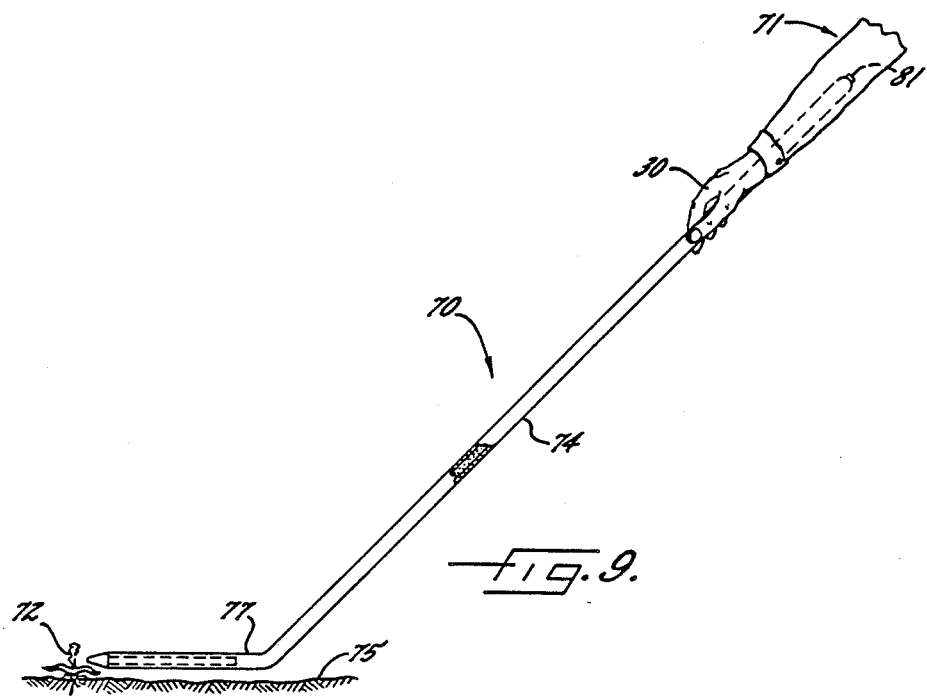
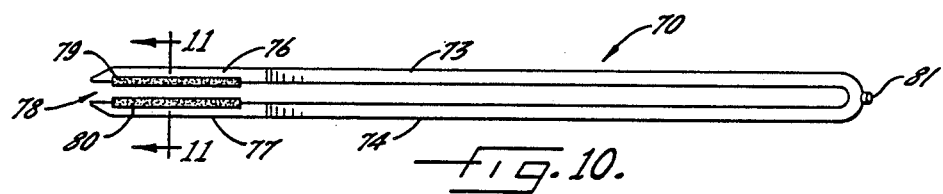
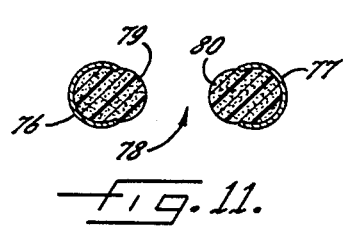
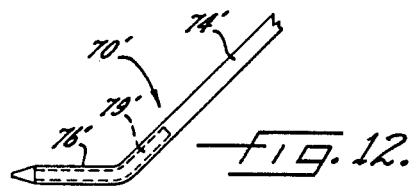
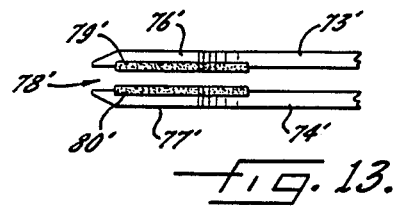

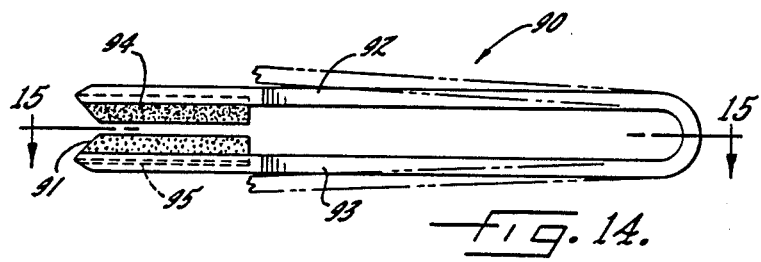
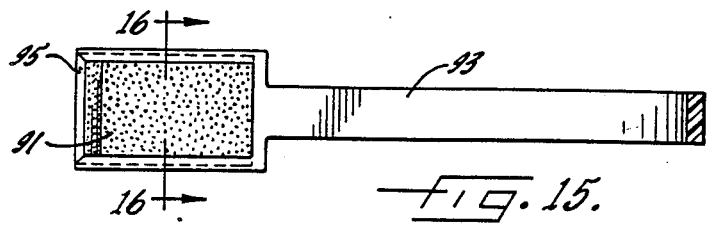
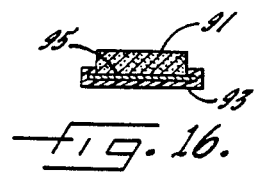
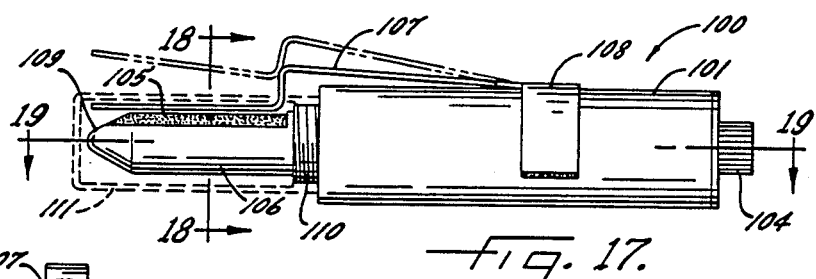
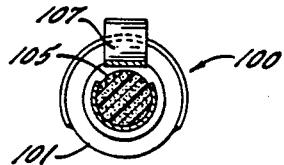
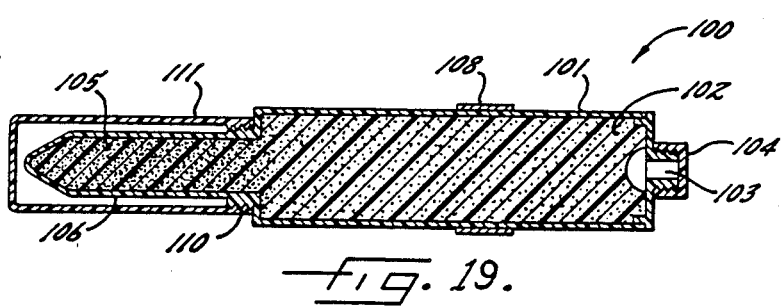

MANUAL DEVICES AND METHODS FOR SELECTIVE APPLICATION OF CHEMICAL SUBSTANCES TO PLANTS

RELATED APPLICATIONS

This is a continuation-in-part of Ser. No. 111,046 filed Oct. 20, 1987 now abandoned, which is a division of Ser. No. 844,119 filed Mar. 26, 1986 which issued on Jan. 5, 1988 as U.S. Pat. No. 4,716,677.

BACKGROUND OF THE INVENTION

1. Field of the Invention

This invention relates to devices and methods for manual application of chemical substances to selected plants at specific locations thereon.

2. Background Art

Conventional methods of applying chemical substances to vegetation include spraying, sprinkling or sowing solutions or mixtures of the chemicals on the whole plant area. Such "broadcast" methods reduce the desired concentrations on the specific plants to be treated, increase the cost of the chemicals, and subject vegetation far removed from the treatment area to the chemicals due to "drift", "vaporization," "translocation," or "leaching".

To avoid these difficulties associated with the broadcast methods, the individual application of chemicals has been made by hand to selected plants. Selective application has permitted the use of highly potent by relatively safe non-selective herbicides for the control of weeds and other undesirable vegetation. A preferred kind of non-selective herbicide is a 41% solution of isopropylamine salt of N-(phosphonomethyl) glicine, as further described in U.S. Pat. Nos. 3,799,758 and 4,405,531 and sold under the trademark "ROUNDUP" by the Monsanto Company, Agricultural Products Div., St. Louis, Missouri 63167.

Weed control at golf courses has been an especially difficult task. As described by Steve M. Batten in his article "Those Irrepressible, Incredibly, Impossible Grassy Weeds!" USGA Green Section RECORD, September/October 1984 pp. 1–4, millions of dollars are spent annually and thousands of hours are devoted to golf course weed control. Weed control methods include scalping, deep-set vertical mowing, turning off irrigation, hand removal, excavation, and starvation by eliminating normal fertilization. Spot application of non-selective herbicide is typically made with hand-held sprayers, plastic squeeze bottles, hypodermic syringes, and paint brushes.

Another known method of spot applications is to use a rubber glove having an outer absorbent mitten or sponge which can be dipped in a container of herbicide solution and then wiped against undesired vegetation.

Still another method of manually applying herbicide to selected plants is to use an applicator of the kind having a handle carrying a sponge at the lower end of the handle. In one such kind of applicator, advertised under the trademark "WALK A WICK", an applicator bottle containing a supply of herbicide solution is mounted on the upper end of the handle and is provided with a calibration valve for metering a regulated flow of herbicide from the applicator bottle to the sponge. A particular version designated as "Model 200 Pro Applicator" has a cylindrical sponge which may be provided with an optional shield.

While these methods and devices are suitable for applying herbicide to a rather large area of plants by sweeping the applicator or sponge across the undesired vegetation, or to isolated plants by blotting them with the tip of the applicator or sponge, considerable care must be taken to avoid contact with desirable grasses, plants or shrubs as injury may occur. Therefore, these devices are not especially suited for applying herbicide to weeds that are surrounded by and in close proximity to desired plants. Also, the exposed foliage of many kinds of plants is not sufficiently stiff to receive a desired amount of herbicide merely contact or wiping against an applicator or sponge.

SUMMARY OF THE INVENTION

Accordingly, the primary object of the invention is to provide an herbicide applicator in which the active applicator surfaces are fully shielded from adjacent plants when applying herbicide to a selected plant.

Another object of the invention is to provide a hand-held applicator for applying chemicals to a selected plant by gripping and pressing a portion of the plant against an applicator surface. A related object is to provide such a liquid applicator in which the amount of chemical to be applied can be manually controlled by variation of the applied pressure and the area of engagement between the applicator and the selected plant. Another related object is to provide such an applicator that can be conveniently held and operated by a single hand.

A specific object of the invention is to provide a hand-held applicator having alternative configurations which can be readily selected by the operator, including a first configuration in which the applicator surface is shielded, and a second configuration in which the applicator surface is fully exposed, when desired, in order to wipe the chemical on any desired object without protection or interference from members that normally serve as shields.

Another object of the invention is to provide a hand-held applicator which can be shipped, stored and handled with an internal supply of liquid chemicals without danger of accidental contact or release of the chemicals. A related object is for such an applicator to be capable of being re-filled any number of times.

A further object of the invention is to provide alternative designs for the components of a hand-held applicator in accordance with the above objective, so that commercially-available low-cost components can be used without modification and other parts can be fabricated at low cost using optimum mass production equipment, techniques and materials.

Briefly, according to an important aspect of the invention, a fully shielded hand-operated herbicide applicator is provided by an applicator assembly in which a porous applicator pad is mounted between the distal portions of a pair of tongs so as to define an application zone for receiving a portion of an undesired plant while fully shielding surrounding vegetation from contact with the herbicide. A supply of liquid herbicide is stored in a small bottle attached to the tongs. One of the tongs is hollow and contains the porous applicator pad and a channel for the liquid to flow from the bottle into the pad when the bottle is squeezed. When pressure on the bottle is released, air is drawn in through the pad and the channel to replace the liquid discharged from the bottle. The second tong consists of a resilient flat strip which the operator can press toward the first tong when maneuvering among plants and when grasping a portion of an undesired plant. Several alternative arrangements are provided for connecting the tongs and bottle together to make an assembly that can be held in one hand and operated by that hand.

BRIEF DESCRIPTION OF THE DRAWINGS

Other objects and advantages of the invention will become apparent upon reading the following detailed description and upon reference to the drawings, in which:

FIG. 9 is an elevation view of an applicator assembly employing tongs which has an elongated handle means for permitting a person standing upright to apply herbicide to a plant at ground level;

FIG. 10 is a plan view of the applicator assembly of FIG. 9;

FIG. 11 is a cross-sectional view along line 11—11 in FIG. 10;

FIG. 12 is a partial elevation view showing a modified version of the applicator of FIG. 9 which has applicator pads extending further up the handle means;

FIG. 13 is a plan view corresponding to FIG. 12;

FIG. 14 is a plan view of an applicator assembly employing tongs which has a solid herbicide bar adjacent to an absorbent sponge containing water for dissolving the solid herbicide;

FIG. 15 is a cross-sectional view along line 15—15 in FIG. 14;

FIG. 16 is a cross-sectional view along line 16—16 in FIG. 15;

FIG. 17 is a plan view of a cylindrical applicator assembly having a self-contained supply of herbicide and which can be sealed for storage and shipment;

FIG. 18 is a cross-sectional view along line 18—18 in FIG. 17;

FIG. 19 is a cross-sectional view along line 19—19 in FIG. 17;

While the invention has been described in accordance with certain preferred embodiments, it will be understood that the intention is not to be limited to the particular embodiments shown, but, on the contrary, the intention is to cover all modifications, equivalents, and alternatives falling within the spirit and scope of the invention as defined by the appended claims.

DESCRIPTION OF THE PREFERRED EMBODIMENTS

Figure 1:
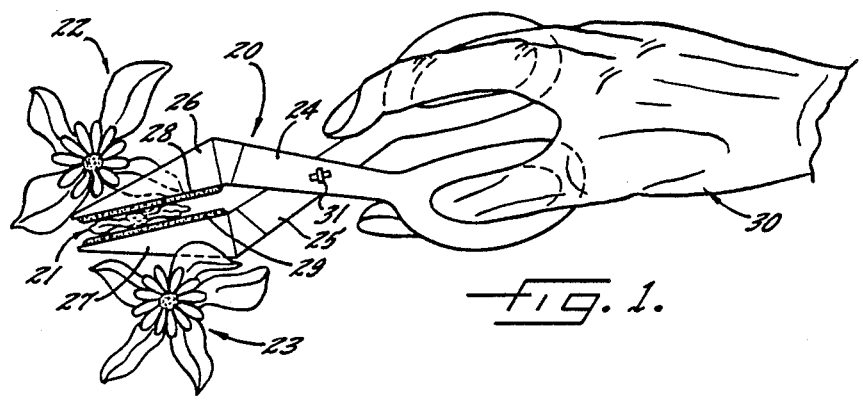
FIG. 1 is a pictorial view of a hand-operated herbicide applicator assembly employing pincers and which is shown being used to kill a selected plant while avoiding damage to adjacent plants.

Turning now to FIG. 1, there is shown a hand-operated applicator assembly generally designated 20 being used to apply a chemical substance such as nonselective herbicide to selected portions of an undesirable plant generally designated 21 which is surrounded by desired plants generally designated 22 and 23. The applicator assembly 20 is comprised of a pair of pincers or elongated members 24 and 25 which having respective distal portions 26 and 27 to which are mounted respective applicator pads 28, 29 which contain the chemical substance.

Each of the elongated members 24, 25 functions as a holder for grasping by a human hand generally designated 30 and as a shield for shielding the surrounding plants 22, 23 from the applicator pads 28, 29. The elongated members 24, 25 are interconnected by a pivot means 31 to permit a variation in the spacing between the distal portions 26, 27 and the respective pads 28, 29 to thereby define an application zone for accepting the selected portions of the plant 21, and also to permit a positive contact pressure to be applied between the applicator pads 28, 29 and the selected portions of the plant 21. Therefore, the amount of chemical applied to the selected portions of the plant 21 can be increased by squeezing the pads 28, 29 closer together by scissors-like movement of the elongated members 24, 25.

Figure 2:
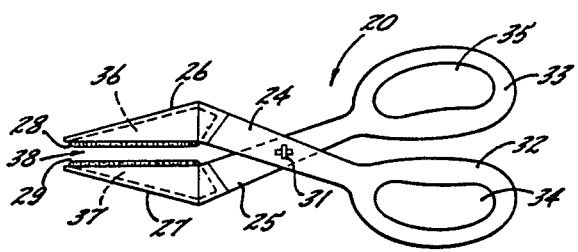
FIG. 2 is a plan view of the applicator employing pincers previously shown in FIG. 1.
Figure 3:
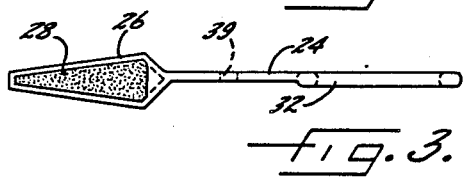
FIG. 3 is a side view of one elongated member of the pincer assembly shown in FIG. 2.

Further details of the applicator assembly 20 are shown in the corresponding top and partial side views in FIGS. 2 and 3 respectively. Each of the elongated members 24, 25 has a respective proximal portion 32, 33 defining an opening 34, 35 for receiving the thumb or fingers of the operator's hand 30. To increase the supply of chemical contained by the applicator pads, the distal portion 26, 27 of each elongated member 24, 25 has a pocket 36, 37 which receives a substantial portion of the respective applicator pad 28, 29 mounted to the elongated member. But the pads 28, 29 extend into the application zone generally designated 38 so that the amount of chemical applied to the plant (21 in FIG. 1) can be controlled up to a maximum amount as the pads squeeze the plant or touch one another before further squeezing action is limited by contact between the opposing faces of the distal portions 26, 27. When the squeezing action is limited by the contact between the opposing faces, the applicator pads 28, 29 recede into the pockets 36, 37 so that the surrounding vegetation is completely shielded from the applicator pads 28, 29 by the distal portions 26, 27 of the elongated members 24, 25.

As shown in FIG. 3 for the pad 28, the applicator pads are tapered from the distal tips of the respective distal portions 26, 27 so that selected vegetation in the distal portion of the application zone between the pads is exposed to only a small area of the pads and selected vegetation further within the application zone is exposed to an increasingly greater area of the pads. Therefore, the amount of chemical substance such as herbicide applied to the selected plant can be varied by the positioning of the selected plant within the application zone as well as by the amount of squeezing pressure exerted on the elongated members 25, 26 and thereby exerted on the selected plant by the opposing surfaces of the applicator pads.

For applying a liquid chemical or solution, the pads 28, 29 are made of an absorbent material such as woven fabric, sponge, or preferably open cell polyurethane or polymethly methacrylate foam. Preferably the pads 28, 29 are adhesively bonded to their respective elongated members 24, 25. The liquid is applied to the pads, for example, by dipping the distal portions of the pads in a container of the solution, and manually operating the applicator assembly to squeeze the pads together to remove excess liquid. Therefore dripping of the liquid will not occur when the applicator assembly is moved among the plants.

Figure 4:
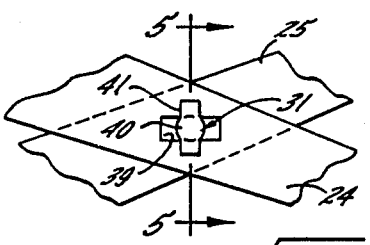
FIG. 4 is a detailed plan view of the intermeshing connecting means of the pincer applicator assembly of FIG. 2.
Figure 5:
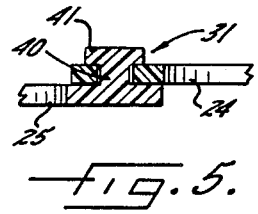
FIG. 5 is a cross-sectional view along line 5—5 of FIG. 4.

So that the elongated members 24, 25 can be easily separated and later reconnected, the pivot connection 31 is provided by a slot 39 in the upper elongated member 24 cooperating with a pin 40 and keeper 41 protruding upwardly from the lower member 25, as more clearly shown in FIGS. 4 and 5. The pin 40 is round, so as to be retained in arcuate portions of the slot 39, but the keeper 41 is rectangular and slightly smaller than the slot 39, so that the elongated members 24, 25 may be separated from each other by a rotation of 902 of one of the elongated members with respect to the other from the position shown in FIG. 2. The keeper 41 and pin 40 are integral with the lower member 25, so that there are no connecting parts to become misplaced. The elongated members 24 and 25 are preferably formed of injection molded thermoplastic resin. Once separated, the elongated members 24, 25 may each function as a hand-held applicator for applying the chemical to selected plants which do not have surrounding plants to be shielded. The separated elongated members, for example, are more easily used to apply non-selective herbicide to weeds growing in the cracks of driveways and sidewalks.

Figure 6:
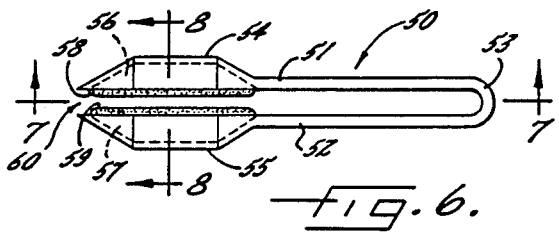
FIG. 6 is a plan view of an applicator assembly employing tweezers or tongs.
Figure 7:
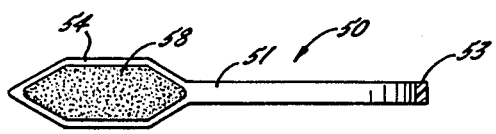
FIG. 7 is a cross-sectional side view along line 7—7 in FIG. 6.

Turning now to FIGS. 6, 7 and B, there is shown another applicator assembly generally designated 50 which comprises a unitary, U-shaped pair of tongs 51 and 52. The tongs 51, 52 are preferably injection molded from a resilient thermoplastic material such as polymethyl methacrylate. Each of the elongated members 51, 52 has a distal portion 54, 55 formed with a pocket 56, 57 receiving a substantial portion of a respective applicator pad 58, 59 for carrying a chemical substance.

During operation, the proximal portions of the elongated members 51, 52 serve as a handle which is squeezed to vary the spacing between the opposing surfaces of the applicator pads 58, 59. To apply a chemical such as non-selective herbicide, the applicator assembly 50 is moved to place a selected plant (not shown) within an application zone 60 between the opposing surfaces of the applicator pads. Then, the proximal portions of the elongated members 51, 52 are manually squeezed to press the applicator pads together and thereby deposit the chemical on the selected plant.

As illustrated in FIG. 7 for the pad 58, the applicator pads are tapered from the distal tips of the respective distal portions 54, 55 so that selected vegetation in the application zone 60 near the distal tips is exposed to only a small area of the applicator pads 58, 59, and selected vegetation further within the application zone is exposed to an increasingly greater area of the applicator pads. Therefore, the amount of chemical substance such as herbicide applied to a selected plant can be varied by positioning of the selected plant within the application zone as well as by the amount of squeezing pressure exerted on the elongated members 51, 52 and thereby exerted on the selected plant by the opposing surfaces of the applicator pads.

Turning now to FIGS. 9, 10, and 11 there is shown a third kind of applicator assembly generally designated 70 which is particularly useful to allow a human operator 71 standing erect to apply a chemical substance to a selected plant 72 at ground level. The applicator 70 includes a unitary pair of tongs having elongated members 73, 74 that are long enough to extend from the ground 75 to the hand 30 of the operator 71 standing upright. Preferably the elongated members 73, 74 are bent so as to have distal portions 76, 77 at an obtuse angle with respect to the proximal portions of the members so that when the distal portions are horizontal with respect to the ground, as shown in FIG. 9, the proximal portions of the elongated members are inclined upward to operator's hand 30. The obtuse angle, for example, is preferably about 135°.

As more clearly shown in FIGS. 10 and 11, the elongated members 73, 74 are parallel spaced and are made of a resilient material so that the operator may control the spacing between the distal portions 76, 77 by manually squeezing the elongated members together.

To define an application zone generally designated 78 for receiving a portion of a selected plant, applicator pads 79, 80 carrying a chemical substance are mounted to the respective distal portions 76, 77. Preferably the elongated members 73, 74 are tubular and the applicator pads 79, 80 are absorbent wicks which extend inside the elongated members. The elongated members, for example, are made of a resilient aluminum alloy and the applicator pads are made of nylon rope wicks. In the region of the distal portions 76, 77, the rope wicks protrude outward from parallel spaced and adjacent openings in the distal portions so that the adjacent surfaces of the applicator pads 79, 80 will touch and be compressed when the distal portions are squeezed together. To facilitate the deflection and shielding of surrounding plants (not shown), the distal tips of the distal portions 76, 77 are beveled or tapered.

The rope wick forming the applicator pads 79, 80 may extend throughout the entire tube forming the elongated members 73, 74 to provide a large reservoir for liquid chemical to be applied to the selected plants.

The liquid chemical may be introduced via a proximal opening normally closed by a threaded plug 81.

Turning now to FIGS. 12 and 13, there is shown a modified version generally designated 70, of the applicator assembly 70 of FIGS. 9 and 10. In order to provide a more extensive application zone 78, and to facilitate operation of the applicator assembly in an elevated horizontal position, such as above a hedge, applicator pads 79′, 80′ are provided which extend part way up the proximal portions of elongated members 73′, 74′. It should be understood that the components which are similar between FIGS. 12, 13 and FIGS. 9, 10 have the same reference numerals but the reference numerals are primed in FIGS. 12 and 13.

Turning now to FIGS. 14, 15 and 16 there are shown various views of still another applicator assembly generally designated 90 which is especially suited for applying a chemical substance provided in the form of a solid bar or cake 91. The applicator assembly 90 has a unitary and resilient pair of tongs including elongated members 92, 93 which are normally in the spaced positions shown in phantom lines but which become parallel as shown when manually squeezed together. As shown, the solid cake or bar 91 is mounted to the distal portion of the elongated member 93 opposite from an absorbent applicator pad 94 mounted to the distal portion of the elongated member 92. Therefore, the distal portions of the elongated members may shield surrounding vegetation (not shown).

Figure 8:
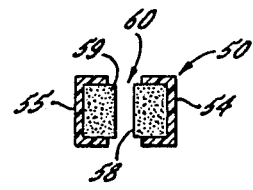
FIG. 8 is a cross-sectional view along line 8—8 in FIG. 6.

During operation, the applicator pad 94 is moistened with a liquid capable of dissolving some of the chemical from the solid bar when the pad is brought into contact with the bar by manually squeezing the two elongated members together. When the pad 94 is released from the bar 91, the opposing surfaces of the pad and bar will contain a solution or film of the chemical dissolved by the liquid solvent. Therefore, the dissolved chemical can thereafter be applied to a selected plant in the same manner as the applicator 50 of FIGS. 6–8 by bringing the plant into the application zone between the pad and bar and pressing the opposing surfaces of the pad and bar against the plant. For applying herbicide, for example, the bar is a cake of solid non-selective herbicide, and the absorbent pad 94 is dampened with water or an aqueous detergent solution.

By applying herbicide from a solid cake, the possibility of accidental spillage is eliminated and also the handling and storage requirements for the herbicide are reduced because the solid form of herbicide is more concentrated. To provide for replacement of the solid bar or cake 91 after it has almost been completely dissolved, the bar or cake 91 is mounted on a flat planar base 95 which is received in a complementary and tight-fitting slot formed in the distal portion of the elongated member 93. When the bar 91 has been consumed, the base 95 is withdrawn and a new base carrying a fresh bar is inserted in the slot.

Turning now to FIGS. 17, 18 and 19, there is shown an applicator assembly generally designated 100 that can be shipped and stored with a self-contained supply of chemical substance. For this purpose the applicator assembly has a hollow handle 101 containing absorbent material 102 such as open cell polyurethane foam or absorbent wick which is dampened with a solution of the chemical substance. The solution is added or replenished through an opening 103 normally sealed by a threaded cap 104. Alternatively, a solid bar or cake of the chemical substance (not shown) could also be enclosed within the handle 101, and the absorbent material 102 could be initially charged and periodically recharged with a solvent. In either case, the applicator 100 would permit relatively safe handling of highly potent herbicide or other chemicals such as fungicide or insecticide.

In order to selectively apply the chemical substance to a chosen plant (not shown) without application to surrounding plants (not shown), the applicator assembly 100 includes an applicator pad 105 partially covered by a cylindrical shield 106 preferably integrally formed as a distal portion of the handle 101. Preferably the applicator pad 105 is integral with the absorbent material 102 within the handle. To completely shield the applicator pad 105, there is also provided a resilient flat strip 107 fastened to the handle 101 by a clip portion 108.

For applying the chemical substance to a selected plant, the plant is guided by a beveled tip portion 109 of the cylindrical shield 106 so as to move the resilient shield 107 to an open position, for example as shown in phantom lines. Therefore, the space between the flexed shield 107 and the applicator pad 105 defines an application zone and the amount of chemical substance applied to a selected plant can be increased by manually positioning the applicator 100 so that the plant falls further within the application zone. As this is done, the flexed shield 107 exerts an increasing amount of pressure driving the plant into firm contact with the surface of the applicator pad 105. Alternatively, the shield is normally in the open position, and pressure on a plant is applied by manually pressing the shield 107 toward the pad 105.

To completely enclose the applicator pad 105 and to seal the chemical substance within the handle 101, the handle is provided with a threaded portion 110 for engagement with a cylindrical cap 111. Since the applicator assembly 100 can be securely sealed by the caps 103 and 111, the assembly may be conveniently shipped and sold to the customer fully charged with the chemical substance. Also, since the applicator assembly 100 may be economically made from injection molded plastic parts, it could be mass produced at a sufficiently low cost so that it could be discarded when the supply of chemical is exhausted.

Figure 20:
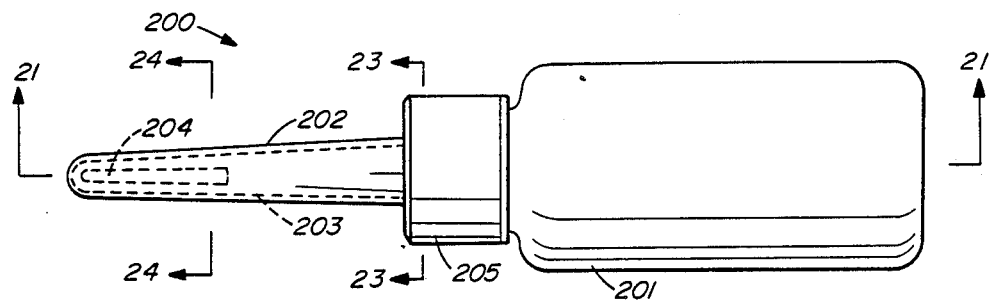
FIG. 20 is a top view of a hand-operated herbicide applicator assembly comprising a squeeze bottle having a threaded outlet, a pair of tongs containing an applicator pad, and a threaded retainer cap for clamping and sealing the tongs to the bottle opening.

Turning now to FIG. 20, there is shown a hand-held, hand-operated applicator assembly generally designated 200, which includes five primary members: a squeeze bottle 201 made of a resilient material and containing the liquid to be applied, a pair of elongated tongs 202 and 203, an applicator pad 204 mounted in one of the tongs (203) and facing the other tong (202), and a threaded cap 205 connecting the tongs to the bottle. This assembly is designed to apply a chemical substance such as a nonselective herbicide to a selected portion of an undesired plant (not shown) while the selected portion is within an application zone (206 in FIG. 21) located between the distal portions of the tongs 202, 203. The chemical is applied by the pad 204 which has a surface 212 within the application zone. The tongs and pad are shaped, positioned and operated so that desirable plants surrounding the undesired plant are fully shielded at all times from contact with the chemical.

All parts of the applicator are preferably made of commonly available plastics. For example, the bottle 201 and tongs 202, 203 are made of polyethylene, the cap 205 polypropylene, and the pad 204 open cell polyurethane sponge.

Figure 21:
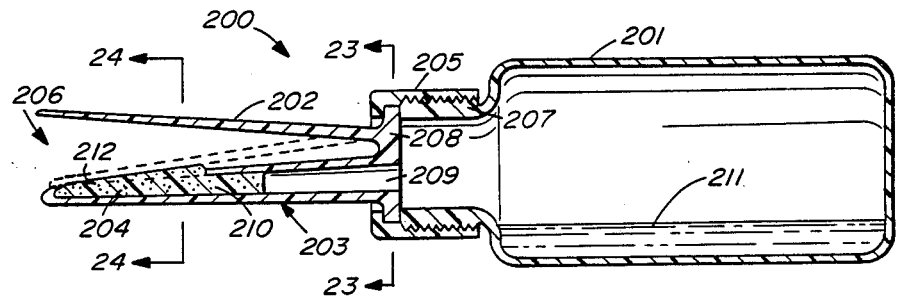
FIG. 21 is a cross-sectional view along line 21—21 in FIG. 20.

Details of the components of the applicator 200 are further shown in the cross-section of FIG. 21. The bottle 201, with its threaded outlet 207 and the "hole in the top" cap 205 are standard, commercially available items. The upper tong 202 is in the form of an elongated strip. The lower tong 203 is a hollow, tapered cylindrical and elongated member. The two tongs 202, 203 and a flange 208 for connection to the threaded outlet 207 of the bottle 201 by the cap 205 are preferably fabricated in one integral piece by injection molding. The lower tong 203 has an elongated channel 209 opening at its distal end for exposing a portion of the applicator pad 204.

The applicator pad 204 consists of an over-size resilient sponge that has been forced through the channel 209 into place so that a narrow, elongated surface is exposed within the application zone 206 and the remainder is compressed within the channel. A highly-compressed portion 210 of the pad 204 serves to prevent leakage of liquid from the applicator assembly when it is not in use, yet allows liquid to flow into the more absorbent portion of the pad when pressure is applied to the bottle 201.

In operation, the bottle 201 is held in the palm of the hand (not shown) and the tongs 202, 203 are pressed toward one another by the thumb and forefinger. When liquid 211 in the bottle 201 is needed in the pad 204, the bottle 201 is inverted if necessary and the hand applies pressure to the bottle 201 in a squeezing action, which causes the liquid to flow via the channel 209 in the hollow tong 203 and through the compressed portion 210 of the pad 204 to its applicator surface 212. When the pressure is released, air is drawn in through the pad 204 and the hollow tong 203 to the bottle 201 to replace the liquid having been transferred to the sponge.

Figure 22:
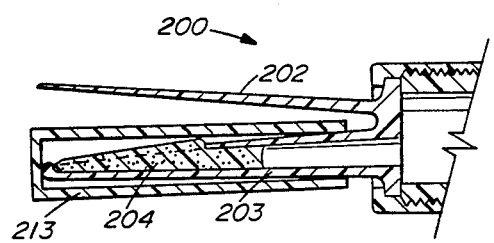
FIG. 22 is a view similar to FIG. 21 but shows a cap installed over the applicator pad.

As shown in FIG. 22, an elongated cylindrical cap 213 can be slid over the distal portion of the hollow tong 203 to completely cover the application pad 204 and seal the liquid 211 within the assembly for storage between periods of use.

Figure 23:
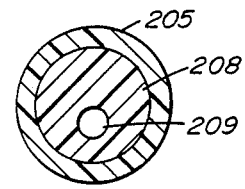
FIG. 23 is a cross-sectional view along line 23—23 in FIG. 20.

As shown in FIG. 23, the bottle cap 205, the flange 208 connecting the tongs, and the channel 209 in the hollow tong (203) are cylindrical in cross-section along line 23—23 in FIG. 20.

Figure 24A:
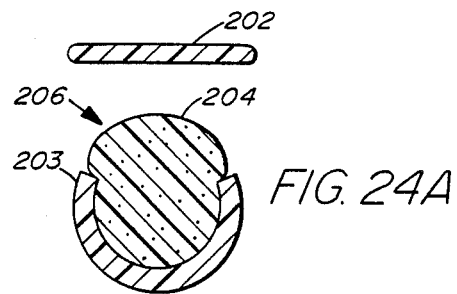
FIG. 24A is a cross-sectional view along line 24—24 in FIG. 20, showing the tongs in a fully-open position.
Figure 24B:
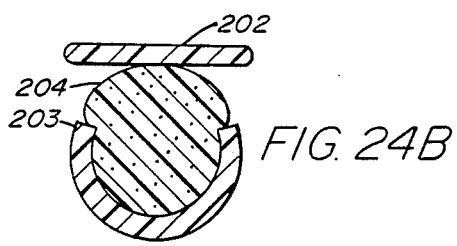
FIG. 24B is another cross-sectional view along line 24—24 in FIG. 20, showing the tongs in a closed position.

FIGS. 24A and 24B are cross-sectional views along line 24—24 in FIG. 20, showing different relationships between the tongs and the applicator pad. In FIGS. 20 and 24A, the tongs are in the normally open position; and in FIG. 24B, the tongs are pressed into the closed position indicated by the phantom lines in FIG. 20. In FIG. 24A, the space between the pad 204 and the resilient tong 202 defines the application zone 206. In FIG. 24B, the resilient tong 202 is depressed until it touches the hollow tong 203, thereby completely eliminating the application zone 206, slightly compressing the pad 204, and shielding the pad from contact with adjacent objects.

When in use, the spacing between the tongs is adjusted by the thumb and index finger pressing the tongs together. The tongs would normally be held in the closed position while being maneuvered among desirable plants to reach a portion of the undesirable plant to be treated. Then the tongs would be allowed to separate enough to receive the plant portion against the applicator pad, and then the tongs could be pressed together to apply a selected amount of liquid chemical to the portion of the plant to be treated. After treatment, the tongs would be allowed to separate enough to release the plant. The tongs could then be pressed together again while being withdrawn, to protect adjacent plants from contact with the chemical.

Figure 25:
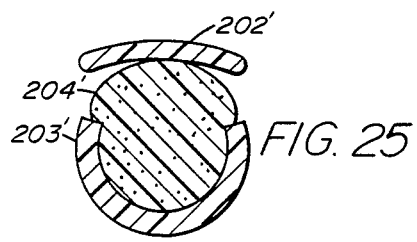
FIG. 25 shows an alternative form of construction in which a resilient one of the tongs is curved.

As shown in FIGS. 24A and 24B, the resilient tong 202 is in the form of a flat strip. (For clarity, FIGS. 24A and 24B are enlarged relative to FIGS. 20–23.) Alternatively, as shown in FIG. 25, the upper tong 202' could be slightly curved to more completely shield the applicator pad 204' when the upper tong first contacts the applicator pad in the closed position. In either case, the tongs could be formed with adjacent surfaces that contact each other when sufficient force is applied to cause the outer surface of the applicator pad 204' or 204 to recede into the interior of the hollow tong 203' or 203 to completely enclose or shield the applicator pad.

Figure 26:
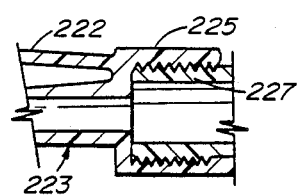
FIG. 26 shows an alternative form of construction for the connection between the tongs and the bottle.
Figure 27:
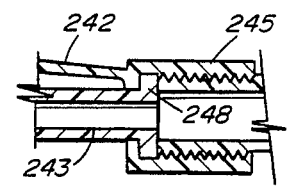
FIG. 27 shows another alternative form of construction for the connection between the tongs and the bottle that permits the tong containing the applicator pad to be rotated so as to serve as an herbicide wiper or dauber.
Figure 28:
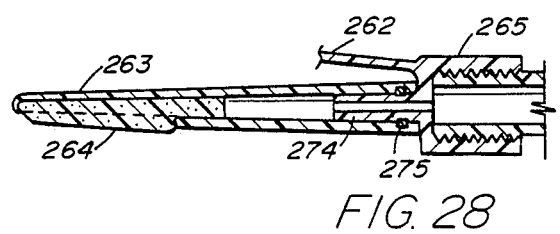
FIG. 28 shows still another alternative form of construction for the connection between the tongs and the bottle that permits the tong containing the applicator pad to be rotated.

FIGS. 26, 27 and 28 are cross-sectional views of alternative forms of construction for the applicator assembly 200, showing alternative means of connecting the basic components. In FIG. 26, the tongs 222, 223 and bottle cap 225 are formed in one integral piece, the flange (208 of FIG. 21) is eliminated, and the threaded outlet 227 of the bottle is smaller in diameter than the threaded outlet 207 in FIG. 21. In FIG. 27, the bottle cap 245 and the resilient tong 242 are formed in one integral piece, and the hollow tong 243 has a flange 248 which is clamped in place by the cap 245. In FIG. 28 the cap 265, resilient tong 262 and a hollow tong support 274 are formed in one integral piece, and the hollow tong 263 is secured in place and prevented from leaking by a seal ring 275. The arrangement of FIG. 28 is provided in order to permit the hollow tong 263 to be rotated with respect to the resilient tong 262 so as to expose the surface of the applicator pad 264 for wiping undesired plants that are not in close proximity to desired plants. For this same purpose the hollow tong 243 in FIG. 27 can also be rotated to any desired position when the cap 245 is loosened.

The applicator assembly 200 is designed to be sold with a self-contained supply of liquid within the bottle, and to permit the bottle to be separated from the other components any number of times for re-filling. There are several ways to prevent leakage of liquid from the bottle during shipment and storage, including the use of a temporary or re-usable cap to enclose the applicator pad, as shown in FIG. 22. Another method would be to provide a temporary seal between the bottle and the other components, and the seal could be removed or punctured by the user to permit the liquid to flow from the bottle into the hollow tong. Still another method would be to separate the bottle from the rest of the assembly for shipment or storage and to seal the bottle with an ordinary bottle cap.

In view of the above, hand-held applicator assemblies for applying chemical substances to selected plants have been described in which the active applicator surfaces are fully shielded from adjacent plants. The chemical substance is applied in a selective and forceful manner by gripping and pressing a portion of the plant against an applicator pad. Alternatively, the applicator pad can be re-positioned in order to wipe the chemical onto vegetation that is located where shielding is not needed. An applicator has been described that contains its own supply of liquid and which can be completely sealed for shipment and storage. Also, several variations in design have been devised so that the most economical combination of mass-produced standard and special components can be selected for the assembly.

What is claimed is:

1. A method of using a hand-held applicator assembly for selectively and accurately applying liquid herbicide to a chosen plant without application to surrounding plants, said applicator assembly comprising a squeeze bottle made of a resilient material and having a threaded outlet, a pair of elongated tongs attached to said outlet by a threaded connector and providing a fully-shielded and elongated application zone between spaced distal portions of said tongs for accepting a portion of said chosen plant, an elongated applicator pad supported within said application zone by one of said tongs, and means for channeling said liquid herbicide from said bottle to said pad wherein at least one of said tongs is sufficiently resilient to press said portion of said chosen plant against said pad when said tongs are squeezed together by the thumb and a finger of a human hand while said bottle is held by said hand and to return said tongs to their original spaced positions when the squeezing is discontinued, said method comprising the steps of:

(a) filling said squeeze bottle with liquid herbicide;

(b) manipulating said bottle to cause said liquid herbicide to flow from said bottle and through said channeling means and into said applicator pad;

(c) the thumb and a finger of said hand squeezing said tongs together to completely shield said applicator pad containing said liquid herbicide, while said hand holds and guides said applicator assembly among said surrounding plants to reach said chosen plant, (d) said thumb and finger then allowing said tongs to separate and receive a selected portion of said chosen plant into said application zone, (e) pressing said portion of said chosen plant against said pad to apply said liquid herbicide to said portion of said chosen plant, and (f) releasing said portion of said chosen plant and withdrawing said assembly with said tongs again squeezed together, all without any of said liquid herbicide having been applied to any portions of said surrounding plants, wherein the tong supporting the applicator pad is hollow and is rotatable with respect to the other tong which is resilient, and said method further comprises the step of rotating the hollow tong so that said applicator pad is positioned towards and then away from the resilient tong.

2. A hand-held applicator assembly for selectively and accurately applying liquid herbicide to a chosen plant without application to surrounding plants, said applicator assembly comprising a bottle having an outlet, a pair of narrow elongated tongs attached to said outlet by a connector and providing a shielded and elongated application zone between spaced distal portions of said tongs for accepting a portion of said chosen plant, an elongated applicator pad supported within said application zone by one of the tongs, and means for channeling liquid herbicide to said pad from said bottle, wherein at least one of said tongs consists of a single piece of flexible material that is sufficiently resilient to press said portion of said chosen plant against said pad when said tongs are squeezed together by a thumb and finger while said bottle is held by a human hand and to return said tongs to their original spaced positions when the squeezing is discontinued, wherein the elongated tongs and the elongated applicator pad have respective lengths and widths such that the respective lengths are at least twice the respective widths, so that the area of engagement between the applicator pad and the chosen plant can be varied over a wide range and the tongs are easily maneuvered among the surrounding plants, and wherein the tong supporting the applicator pad is hollow and the other tong is resilient, the resilient tong and the connector are formed in one integral piece, and the connector has a hollow projecting support onto which the hollow tong is tightly fitted and held in place by a seal ring positioned between the tong and the support, to thereby permit the hollow tong to be rotated with respect to said resilient tong so that the surface of the applicator pad can be positioned either toward or away from the resilient tong.

3. A hand-held applicator assembly for selectively and accurately applying liquid herbicide to a chosen plant without application to surrounding plants, said applicator assembly comprising a bottle having an outlet, a pair of narrow elongated tongs attached to said outlet by a connector and providing a shielded and elongated application zone between spaced distal portions of said tongs for accepting a portion of said chosen plant, an elongated applicator pad supported within said application zone by one of the tongs, and means for channeling liquid herbicide to said pad from said bottle, wherein at least one of said tongs consists of a single piece of flexible material that is sufficiently resilient to press said portion of said chosen plant against said pad when said tongs are squeezed together by a thumb and finger while said bottle is held by a human hand and to return said tongs to their original spaced positions when the squeezing is discontinued, wherein the elongated tongs and the elongated applicator pad have respective lengths and widths such that the respective lengths are at least twice the respective widths, so that the area of engagement between the applicator pad and the chosen plant can be varied over a wide range and the tongs are easily maneuvered among the surrounding plants, and wherein the tong supporting the applicator pad is hollow and the other tong is resilient, the connector is in the form of a bottle cap having a hole in its top, the resilient tong and the cap are formed in one integral piece, the hollow tong is formed with a flange at its proximal end, and the cap secures the hollow tong against the bottle opening with the hollow tong projecting through said hole, said hollow tong thereby being rotatable when said bottle cap is disconnected from said bottle outlet so that the surface of the applicator pad can be positioned either toward or away from the resilient tong.

4. A hand-held applicator assembly for selectively and accurately applying liquid herbicide to a chosen plant without application to surrounding plants, said applicator assembly comprising:

a squeeze bottle having a threaded outlet;

a pair of narrow, elongated and tapered tongs attached to said outlet by a threaded connector, a first one of said tongs comprising a flexible and resilient strip, a second one of the tongs comprising a hollow tube having a channel to the interior of said squeeze bottle and having near its distal end an elongated slot in a sidewall adjacent the first tong, the tongs being aligned and spaced from each other in the absence of any forces tending to bend said flexible and resilient strip; and an elongated piece of absorbent material compressed into the hollow tong so that an elongated portion of said absorbent material projects through said slot into an application zone between said tongs, wherein said first tong is fixed to the threaded connector and the hollow tube of the second tong is rotatably mounted to said threaded connector, to thereby permit the hollow tong to be rotated so that the portion of the absorbent material projecting through said slot can be positioned either toward or away from the resilient tong.

* * * * *